United States Patent [19]
Chan et al.

[11] 3,887,510
[45] June 3, 1975

[54] PROCESS FOR LOW TEMPERATURE PREPARATION OF AQUEOUS SOLUTION OF POLYALKYLENE AMINE-POLYAMIDE RESINS

[75] Inventors: Lock-Lim Chan; John Edward Amy, both of Scarborough, Ontario, Canada

[73] Assignee: Borden, Inc., Columbus, Ohio

[22] Filed: Jan. 24, 1973

[21] Appl. No.: 326,503

Related U.S. Application Data

[62] Division of Ser. No. 164,826, July 21, 1971, abandoned.

[52] U.S. Cl..... 260/29.2 N; 117/143 A; 260/78 TF; 260/78 SC
[51] Int. Cl............................................ C08g 20/38
[58] Field of Search........ 260/29.2 N, 78 SC, 78 TF

[56] References Cited
UNITED STATES PATENTS

| | | |
|---|---|---|
| 2,149,273 | 3/1939 | Carothers........................ 260/78 TF |
| 2,632,748 | 3/1953 | Caldwell ......................... 260/78 TF |
| 2,882,185 | 4/1959 | Valko et al. .................... 260/78 SC |
| 2,926,154 | 2/1960 | Keim............................... 260/78 SC |
| 3,250,664 | 5/1966 | Conte et al. .................... 260/78 SC |
| 3,329,657 | 7/1967 | Strazdins et al................. 260/78 SC |
| 3,434,984 | 3/1969 | Hyland............................ 260/78 SC |
| 3,640,840 | 2/1972 | Zieman et al................... 260/78 SC |

Primary Examiner—Harold D. Anderson
Attorney, Agent, or Firm—George P. Maskas; George A. Kap

[57] ABSTRACT

An improved method for obtaining long-chain water-soluble polyamides suitable for conversion by expoxidation to wet-strength paper resins; diesters derived from $C_3$ to $C_6$ saturated aliphatic dicarboxylic acids and $C_1$ to $C_3$ saturated aliphatic monohydric alcohols are reacted in the absence of water, preferably at about 80°–105°C. with polyalkylene polyamines having two primary amine groups and at least one secondary or tertiary amine group.

3 Claims, No Drawings

PROCESS FOR LOW TEMPERATURE PREPARATION OF AQUEOUS SOLUTION OF POLYALKYLENE AMINE-POLYAMIDE RESINS

This is a division of application Ser. No. 164,826 filed July 21, 1971, now abandoned.

BACKGROUND OF THE INVENTION

Among resins useful in imparting wet-strength to paper, cationic thermosetting resins have been disclosed in U.S. Pat. Nos. 2,926,116 and 2,926,154 which are prepared by reacting epichlorohydrin in aqueous solution with intermediate long-chain water-soluble polyamides derived from certain saturated aliphatic dicarboxylic acids and polyalkylene polyamines having two primary amine groups and at least one secondary amine group.

In the above-cited prior-art the method disclosed for the preparation of the intermediate polyamide comprises reacting the polyamine with the dicarboxylic acid at 110°C to 250°C, preferably 160°–210°C. Such procedure has several disadvantages resulting from the relatively high temperature required. One objection is the formation of minor amounts of by-products which lead to undesirably dark color in the final epoxidized resin and which are generally removed by costly and time-consuming purification steps. Another deficiency is inherent in the tendency of the reactants to undergo steam-distillation at the high reaction tempeature, requiring special expensive engineering to assure the correct proportions and proper reaction control for acceptable yields.

According to prior disclosure, the reaction of dicarboxylic acid with polyalkylene polyamine is preferably carried out in aqueous solution. The need to use water to dissipate the heat of neutralization which develops when the acid and base reactants are first contacted tends to slow the overall progress of the intended reaction by a reverse hydrolytic reaction and the aforementioned steam distillation difficulties are aggravated.

SUMMARY OF THE INVENTION

A method has now been found whereby the aforesaid intermediate polyamide can be prepared, substantially without said undesirable by-products, in good yield without special engineering techniques by use of certain diesters instead of the acids.

In short, the instant invention comprises reacting the polyalkylene polyamine in the absence of water, preferably at about 80°– 105°C., with a diester of the acid, said diester being derived from a $C_3$ to $C_6$ saturated aliphatic dicarboxylic acid and a $C_1$ to $C_3$ saturated aliphatic monohydric alcohol. The alcohol formed during the formation of the polyamide of the polyalkylene polyamine is recovered and the polyamide is used in a manner such as described in the above-cited prior-art patents.

DETAILED DESCRIPTION

In carrying out the method of this invention the dicarboxylic diester and polyalkylene polyamine, in the mol ratio of polyamine to diester equal to from about 0.8 to 1.4, are mixed in substantially anhydrous condition. No water is added. The solution or mixture is heated preferably to about 80°–95°C. and refluxed at a temperature within this range until the desired amide-forming reaction is substantially complete, usually taking about two hours. The alcohol formed in the reaction is then "stripped off", conveniently at about 95°–105°C. After recovery of the alcohol, the appropriate amount of water is added to prepare an aqueous solution of the polyalkylene polyamide at desired concentration.

The dicarboxylic diesters contemplated for use in carrying out the method of this invention are the diesters derived from $C_3$ to $C_6$ saturated aliphatic dicarboxylic acids and, respectively, the $C_1$ to $C_3$ saturated aliphatic monohydric alcohols. As to the acids from which the esters are derived these can exemplarily be malonic, succinic, glutaric or adipic acids. The alcohol forming the ester can be, singly or in combination, methanol, ethanol, n1propanol or isopropanol. The esters of methanol and ethanol are preferred, in particular the methyl esters. While corresponding esters derived from higher alcohols also undergo the reaction of this invention, their higher cost and their more difficult removability by "stripping" (on account of their higher boiling points) makes them less desirable.

Exemplary of the diester reactant, there can be mentioned dimethyl malonate, diethyl malonate, dimethyl succinate, di-isopropyl succinate, dimethyl glutarate, di-isobutyl glutarate, dimethyl adipate, di-n-propyl adipate, methyl ethyl adipate or a mixture of dimethyl adipate and diethyl glutarate. Dimethyl adipate and dimethyl glutarate are the preferred esters. Blends of two or more esters of $C_3$ to $C_6$ acids can be used.

The polyalkylene-polyamine can be selected singly or in combination from those having two primary amine groups and at least one amine group which is either secondary or tertiary, i.e., the polyalkylene-polyamine of this invention has the generic formula:

$$H_2NC_nH_{2n} - (NRC_nH_{2n})_xNH_2 \qquad (1)$$ 

where R is either $C_1$ to $C_4$ alkyl, or hydrogen ($x$ can vary from 1 to about 5 and n can vary from 2 to 6). Among the suitable amines which belong in this class are diethylenetriamine, triethylenetetramine, tetraethylenepentamine, dipropylenetriamine, 4-methyldiethylenetriamine, 5-methyldipropylenetriamine, 4, 7-dialkyltriethylenetetramine, and dihexylenetriamine. The preferred polyamine is diethylenetriamine.

It is desirable, in some cases, to increase the spacing of secondary amine groups on the polyamide molecule in order to change the reactivity of the subsequent polyamide-epichlorohydrin product. This can be accomplished by substituting a diamine such as ethylenediamine, hexamethylenediamine and the like for a portion of the polyalkylene-polyamine. For this purpose, up to about 80 percent of the polyalkylene-polyamine can be replaced by a molecularly equivalent amount of the diamine. Usually, a replacement of about 50 percent or less will serve the purpose.

The reaction taking place in the method of this invention involves no preliminary formation of a salt as in the prior art and therefore avoids both the sudden initial exothermic heat of neutralization and also the necessity of raising the temperature to 160°–210°C in order to get efficient conversion of said salt into the desired amide.

The direct reaction between the diester and polyalkylene-polyamine can be visualized as either an acylation of the polyamine or as an amidation of the ester wherein the alkoxy group of the ester is replaced by an amide group. In order to obtain a polyamide product in optimum yield with optimum color properties, the temperature employed for carrying out this acylation or amidation is preferred to be from about 80°C to no higher than about 105°C., temperatures in the range of about 80°–95°C. being particularly suitable. However, a temperature up to about 120°C. or 140°C. is effective for obtaining products with certain superior combinations of properties, and some of the benefits of the instant invention can be obtained when the reaction temperature is as high as about 170°C.

In carrying out the reaction, it is preferred to use an amount of diester sufficient to react substantially completely with the primary amine groups of the polyalkylene-polyamine but insufficient to react with the secondary or tertiary amine groups to any substantial extent. This will usually require a mole ratio of polyalkylenepolyamine to diester from about 0.9/1 to about 1.2/1. However, mol ratios of from about 0.8/1 to about 1.4/1 can be used with satisfactory results. Mol ratios outside of these ranges are generally unsatisfactory. Thus, mol ratios below about 0.8/1 result in a gelled product or one having a pronounced tendency to gel while mol ratios above 1.4/1 result in low molecular weight polyamides. Such products do not produce efficient wet-strength resins when reacted with epichlorohydrin.

For best yields it is preferred to carry out the acylation reaction of this invention at atmospheric pressure. However, particularly during the "stripping" stage of removing and recovering the alcohol formed, reduced pressure can be used, making possible the efficacy of even lower temperatures than those cited above.

The time of reaction depends on the temperatures and pressures used but will ordinarily vary from about 1.5 to about 3 hours. In any event, the time of reaction is selected so that, at the particular temperature, pressure and ratio of reactants used, a suitable molecular weight of polyamide is obtained. The molecular weight should be sufficiently high to yield an effective wet-strength resin after epoxidation, but not high enough to reduce the water-solubility of the polyamide during the epoxidation stage. Molecular weight is conveniently characterized by intrinsic viscosity as measured in a 1-normal ammonium chloride solution at 25°C. using a well-known procedure such as that described in Flory "Principles of Polymer Chemistry" (1953) page 309. To be suitable for the contemplated use, a polyamide can have a thus measured intrinsic viscosity equal to from about 0.03 to 0.25 dl/gram. A polyamide having an intrinsic viscosity of from about 0.08 to 0.12 dl/gram is preferred.

It is preferred to keep the temperature at no higher than about 95°C. until at least the monomeric forms of diester and polyamine have been removed by coreaction and then to remove the by-product alcohol by distillation at a temperature of no higher than about 105°C., until the acylation reaction has proceeded to the point where the desired molecular weight (intrinsic viscosity) of the polyamide has been reached.

An essential part of the instant invention is the absence of water during the acylation of the polyalkylene amine. In the presence of water a polyamide product with the desired properties is not obtained under the temperature conditions of this invention. It is believed that the reason for this originates in hydrolysis of ester groups, reverting to prior-art conditions necessitating elevated temperatures to achieve the desired amide formation. Thus, for example, when dimethyl adipate is hydrolyzed in the presence of diethylenetriamine, there is formed a diethylene triammonium adipate salt which acylates (i.e., adipylates) diethylene triamine with greater difficulty than dimethyl adipate does. It is believed also that water tends to reverse the intended reaction by hydrolyzing some of the amide linkages formed, again a complication present in the prior-art procedure and one of the reasons why it is preferred in the prior-art to commence "stripping" the water of neutralization at the very start of amidation.

By contrast, in the preferred procedure of the instant invention, the amidation or acylation can be substantially completed before "stripping" of methanol is commenced. It is even permissible to use additional methanol or other lower $C_1 - C_3$ saturated aliphatic alcohol as a solvent for the reactants if desired, without substantially affecting the yield or purity of the product. Preferably, such solvent additions are omitted so as to gain maximum economic benefits which accure from minimizing the amount of recycled alcohol.

In converting the polyamide, formed as above described, to a cationic thermosetting resin, it is reacted with epichlorohydrin at a temperature from about 30°C. to about 100°C. and preferably between 45°C. and 70°C. until viscosity of a 25 percent solids solution at 25°C. has reached about B or higher on the Gardner-Holdt scale. This reaction is preferably carried out in aqueous solution to moderate the reaction. Adjustment of pH is usually not necessary. However, since the pH decreases during the epoxidation phase of the reaction it may be desirable, in some cases, to add alkali to combine with at least some of the acid formed. This creates an environment favoring the conversion of the chlorohydrin groups to epoxide groups, thereby increasing the ratio of the latter to the former.

When the desired viscosity of the epoxidized polyamide solution is reached, sufficient water is then added thereto to adjust the solids content to the desired amount, i.e., about 10 percent solids more or less; the product is cooled to about 25°C. and is then stabilized by adding sufficient acid to reduce the pH at least to about 6 and preferably to about 5. Any suitable acid such as hydrochloric, sulfuric, nitric, formic, phosphoric and acetic acid may be used to stabilize the product, hydrochloric acid being preferred.

In the polyamide-epichlorohydrin reaction it is preferred to use sufficient epichlorohydrin to be chemically equivalent to the sum of the secondary and tertiary amine nitrogens present in the polyamide; thus the mols of epichlorohydrin used are preferably equal to the total number of mols (i.e., molecular equivalents) of R in formula (1) above. However, more or less may be added to moderate or increase reaction rates. In general, satisfactory results can be obtained utilizing from about 0.5 mol to about 1.8 mols of epichlorohydrin for each mol of secondary and/or tertiary amine group of the polyamide. It is preferred to utilize from about 1.0 mol to about 1.5 mols for each mol of secondary and/or tertiary amine groups of the polyamide.

The cationic polyamide-epichlorohydrin resins, prepared as herein described, are clear, light-colored products and without any decolorizing treatment can be applied to paper and the like without affecting the quality of color. Said resins can be applied to paper or other felted cellulosic products by tub application or by spraying, if desired. Thus, for example, preformed and partially or completely dried paper may be impregnated by immersion in, or spraying with, an aqueous solution of the resin following which the paper may be heated for about 0.5 to 30 minutes at temperatures of 90°C. to 100°C. or higher to dry same and cure the resin to a water-insoluble condition. The resulting paper has greatly increased wet strength, and, therefore, this method is well suited for the impregnation of paper towels, absorbent tissue and the like as well as heavier stocks such as wrapping paper, bag paper and the like to impart wet-strength characteristics thereto.

The preferred method of incorporating these resins in paper, however, is by internal addition prior to sheet formation whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, thereby curing the resin to its polymerized and water-insoluble condition and imparting wet-strength to the paper.

The epoxidized polyamide resins made with the polyamide of this invention impart wet strength to paper when present therein in amounts of about 0.1–5 percent or more based on the dry weight of the paper. The quantity of resin to be added to the aqueous stock suspension will depeon on the degree of wet-strength desired in the finished paper product and on the amount of resin retained by the paper fibers.

The uncured cationic thermosetting resins derived from the polyamide intermediate of this invention, when incorporated in paper in any suitable manner, as described above, may be cured under acid, neutral or alkaline conditions, i.e., at pH's from about 4.0 to 10, by subjecting the paper to a heat-treatment for about 0.5 to 30 minutes at a temperature from about 90° to 100°C. Optimum results, however, are obtained under alkaline conditions. In view of this, and the rather extensive corrosion of equipment encountered at pH's below about 6.0, it is preferred to carry out the curing step at a pH from about 6.0 to about 9.0.

This invention will be further illustrated by description in connection with the following examples of the practice of it. In these examples and elsewhere herein, the proportions are expressed as parts by weight except where specifically stated to the contrary.

EXAMPLE 1

To a 3-necked flask equipped with a mechanical stirrer, a sample tube, a thermometer and a reflux condenser, 108.0 grams (1.02 mol) of diethylenetriamine and 160 grams (1.00 mol) of dimethyl glutarate were charged. These two reactants were completely miscible and no heat was evolved during the mixing. No water was added. This solution was refluxed at 90°C. for three hours. Then, a distilling condenser was used in place of the refluxing condenser and the solution was heated gradually to 105°C for about three hours to strip off the methanol. When the viscosity of the solution at 105°C. reached a Brookfield viscosity of 100,000 cps., an addition of 200 mls of water was made. The clear light-colored solution of intermediate polyamide had a solids content equal to 53.5 percent, its pH was 10.2 and its viscosity at 25°C. was 340 centipoises (using a Brookfield LV2 at 60 rpm). Intrinsic viscosity of polymer was found to be 0.10 dl/gram in 1 n aqueous ammonium chloride at 25°C. The purity of the recovered methanol was determined by gas chromatography to be 97 percent.

EXAMPLE 2

The procedure of Example 1 was applied to 174 grams of dimethyl adipate and 110 grams of diethylene triamine. The resulting product, at 52.9 percent solids, had pH equal to 9.8, and the Brookfield viscosity was 180 centipoises. It was a light coloured product. The intrinsic viscosity of polymer was found to be 0.085 dl/gram in 1 n aqueous ammonium chloride at 25°C.

EXAMPLE 3

The procedure of Example 1 was applied to 174.0 grams of tetraethylene pentamine and 132.5 grams of dimethyl succinate. The light-colored product at 31.7 percent solids had a pH equal to 10.2 and a Brookfield viscosity of 40 centipoises. The intrinsic viscosity of polymer was found to be 0.14 dl/gram in 1 n aqueous ammonium chloride at 25°C.

EXAMPLE 4

This example illustrates the use of the polyamide made by this invention to form an epoxidized cationic resin. Into a three-necked flask equipped with mechanical stirrer, reflux condenser, thermometer and sampling device, there was charged 155.0 grams of an intermediate polyamide solution as produced in Example 1, also 150.0 ml of water and 40.6 grams of epichlorohydrin. The solution was heated to and held at 50°–55°C. When the Brookfield viscosity of the solution reached 155 centipoises (LV2, 60 rpm, 50°C.) 300 ml of water was added and the pH was adjusted to 5.0 with hydrochloric acid. The light-colored product had 15.8 percent solids and a Brookfield viscosity at 25°C. equal to 45 cps.

EXAMPLE 5

This example is in further illustration of the use of a polyamide made by this invention to form an epoxidized resin.

The procedure of Example 4 was applied to 117 grams of the product of Example 2, also 100 ml of water and 38.5 grams of epichlorohydrin. The clear, light-colored product had 21.4 percent solids, pH equal to 5.8 and a Brookfield viscosity at 25°C. equal to 50 centipoises.

EXAMPLE 6

Again illustrating the use of a polyamide made by this invention in forming an epoxidized resin, the procedure of Example 4 was applied to 150 grams of the intermediate polyamide solution of Example 3 together with 100 ml of water and 33.4 grams of epichlorohydrin. The resultant light-colored product had 14.3 percent solids, pH equal to 5.1 and Brookfield viscosity at 25°C. equal to 5 centipoises.

EXAMPLE 7

To illustrate the usefulness of the epoxidized resin derived from the intermediate polyamide made by the process of this invention, the product of Example 4 was used as a wet-strength resin according to the following standard procedure.

A 1/1 blend of bleached sulfite and bleached kraft pulp at 1.6 percent consistency was beaten to a Canadian Standard Freeness of 484. This slurry was then diluted to a consistency of 0.25 percent and there was added 150 ppm of calcium carbonate. The pH was adjusted to 7.0 with hydrochloric acid and the resulting pulp slurry was used as a stock for resin addition. To one liter aliquots of the stock slurry 1.5 ml of a 1.25 percent solution of the resin was added. This is equivalent to the addition of 0.75 percent resin solids based on the bone dry pulp. The resin-treated slurry was then agitated for ten minutes after which the slurry was emptied into a handsheet mold where it was diluted with makeup water to 12 liters. The makeup water was derived from deionized water containing 150 ppm of calcium carbonate and the pH adjusted to 7.0 with hydrochloric acid. The wet handsheet was pressed between felts to a consistency of about 32 percent and was then dried on a drum drier at 220°F. to a moisture content of 5 – 6 percent (machine dry). The resulting sheet which was of good color quality was then conditioned at 72°F. & 50 percent relative humidity overnight. Wet and dry tensile strengths were determined on a Thwing-Albert Electro-Hydraulic tensile tester with strengths measured in pounds per 15 millimeters width. The wet tensile strength was determined after soaking the specimen in water containing 0.1 ml of a 1 percent solution of Triton X-100 (a commercially available surfactant identified by manufacturers as octyl phenoxy polyethoxy ethanol) per 1000 ml. for ten minutes. Specimens were also tested for wet and dry tensile strength after an additional cure of one hour at 220°F. (Oven cure) followed by conditioning overnight at 72°F. & 50 percent R.H.

Typical results of the above tests are summarized in Table I, wherein eight specimens were used for each resin under each test condition and the results represent the average of the eight specimens.

TABLE I

| Drying Conditions | pH | Resin Level % | Dry Tensile (lb/15 mm) | Wet Tensile (lb/15 mm) | % Wet Strength |
|---|---|---|---|---|---|
| Machine Dry | 7.0 | 0.25 | 10.5 | 1.33 | 12.7 |
| | 7.0 | 0.50 | 11.1 | 1.56 | 14.1 |
| | 7.0 | 1.00 | 11.5 | 1.89 | 17.0 |
| | 5.5 | 0.25 | 10.3 | 0.99 | 10.6 |
| | 5.5 | 0.50 | 10.9 | 1.26 | 11.6 |
| | 5.5 | 1.00 | 10.9 | 1.44 | 13.2 |
| Oven Cure | 7.0 | 0.25 | 10.0 | 2.35 | 23.5 |
| | 7.0 | 0.50 | 11.5 | 3.02 | 26.3 |
| | 7.0 | 1.00 | 11.1 | 3.20 | 28.8 |
| | 5.5 | 0.25 | 10.6 | 2.11 | 19.9 |
| | 5.5 | 0.50 | 11.6 | 2.72 | 23.5 |
| | 5.5 | 1.00 | 11.4 | 2.72 | 23.9 |

EXAMPLE 8

The usefulness of the epoxidized resin derived from the intermediate polyamide made by the process of this invention was further illustrated by applying the products of Examples 4 and 5 as paper saturants. The respective resins were diluted to 0.5 percent solids content with distilled water and the pH was adjusted in each case to 7.0.

Strips of Whatman No. 1 Chromatography Paper (2.0 cm wide and 7 inches long) were dipped in the resin solution for 2 seconds and then immediately removed and immersed in one liter of tap water, which had been adjusted to pH 7.0 beforehand, for 10 minutes. Afterwards, these strips of paper were blotted and cured in an oven at 240°F. for one hour yielding paper of good color quality. The strips were aged in a desiccator over silica gel for 24 hours.

Tensile tests were made on a Thwing-Albert Model 37-4 Electrohydraulic tensil tester, pulling at a rate of 2 inches per minute. Five samples corresponding to each resin were tested and the average values for both wet and dry tensile are summarized in Table II.

TABLE II

| Resin from | Dry Tensile (lbs/2 cm) | Wet Tensile (lbs/2 cm) | % Wet Strength |
|---|---|---|---|
| Example 4 | 12.6 | 3.53 | 27.9 |
| Example 5 | 12.0 | 2.39 | 19.9 |

What is claimed is:

1. In a process of preparing an aqueous solution of cationic thermosetting resin by (a) forming a long-chain water-soluble polyamide from a diester of a $C_3$ to $C_6$ saturated aliphatic dicarboxylic acid with a $C_1$ to $C_3$ saturated aliphatic alcohol and a polyalkylene polyamine having two primary amine groups and at least one secondary amine group the mol ratio of said polyamine to said diester being from about 0.8/1 to 1.4/1, and (b) then reacting said polyamide in aqueous solution with epichlorohydrin in amount such that the mol ratio of epichlorohydrin to the sum of secondary and tertiary amine groups in the polyamide is from about 0.5/1 to about 1.8/1, the improvement which comprises forming the polyamide by reacting the polyalkylene polyamine under substantially anhydrous conditions at from about 80° to about 95°C., from about 1.5 to 3 hours, at atmospheric pressure with the diester and removing the alcohol formed at a temperature no higher than about 105°C. to produce a polyamide having an intrinsic viscosity of from about 0.08 to 0.12 dl/gram in 1 n aqueous ammonium chloride at 25°C.

2. The improvement according to claim 1, wherein the diester is dimethyl glutarate.

3. The improvement according to claim 1, wherein the diester is dimethyl adipate.

* * * * *